US007717505B2

(12) United States Patent
Yu

(10) Patent No.: US 7,717,505 B2
(45) Date of Patent: May 18, 2010

(54) SADDLE HAVING A CUSHION SANDWICHED BETWEEN A PAD AND A BASE

(75) Inventor: Tsai-Yun Yu, Taichung Hsien (TW)

(73) Assignee: International Bicycle Products Corporation, Taichung Hsien (TW)

( * ) Notice: Subject to any disclaimer, the term of this patent is extended or adjusted under 35 U.S.C. 154(b) by 0 days.

(21) Appl. No.: 12/243,487

(22) Filed: Oct. 1, 2008

(65) Prior Publication Data

US 2010/0019553 A1    Jan. 28, 2010

(30) Foreign Application Priority Data

Jul. 25, 2008    (TW) .............................. 97128422 A

(51) Int. Cl.
*B62J 1/00* (2006.01)
(52) U.S. Cl. ..................................... 297/202
(58) Field of Classification Search ............. 297/195.1, 297/199, 200, 202, 214
See application file for complete search history.

(56) References Cited

U.S. PATENT DOCUMENTS 540,725 A * 6/1895 Craig ........................ 297/200
5,686,035 A * 11/1997 Tornero ...................... 264/161
6,039,396 A * 3/2000 Muser ........................ 297/214

FOREIGN PATENT DOCUMENTS

JP        76035229 B   * 10/1976

* cited by examiner

*Primary Examiner*—Milton Nelson, Jr.
(74) *Attorney, Agent, or Firm*—Thomas, Kayden, Horstemeyer & Risley, LLP

(57) ABSTRACT

A cushioned saddle is provided. The saddle is defined with a crotch portion and a buttocks portion. The saddle comprises a pad, a base disposed beneath the pad, at least one cushion, a first fastening device and a second fastening device. The cushion is disposed between the base and the pad, with a contour substantially the same as that of the pad at the buttocks portion and adapted to space the base and the pad apart from each other. The first fastening device is adapted to fasten the cushion and the base together. The second fastening device is adapted to fasten the cushion and the pad together. The pad and the base are cushioned by the cushion disposed therebetween.

17 Claims, 7 Drawing Sheets

SADDLE HAVING A CUSHION SANDWICHED BETWEEN A PAD AND A BASE

This application claims priority to Taiwan Patent Application No. 097128422 filed on Jul. 25, 2008.

CROSS-REFERENCES TO RELATED APPLICATIONS

Not applicable.

BACKGROUND OF THE INVENTION

1. Field of the Invention

The present invention relates to a saddle, and more particularly, relates to a cushioning saddle of a bicycle.

2. Descriptions of the Related Art

Bicycle riding has become a popular pastime, as well as a mode of transportation due to its energy and financial advantages. Because bicycles do not need fossil fuels, consumers are able to save money as well as the environment because of its lack of exhaust emission. Accordingly, the performance of various elements of the bicycle has continuously been improved to enhance the riding experience.

When riding on a bumpy road, a rider may experience considerable discomfort due to the bouncy motion over an extended period of riding. Among various elements of the bicycle, the saddle is the one that supports the rider's weight most directly, and the impact force arising from the bumpy motions is transferred to the rider mostly via the saddle. Hence, the saddle plays a very important role in keeping the rider comfortable.

Conventional saddles dispose two metal spring coils between the saddle and the bicycle frame to absorb the impact force. However, because the metal spring coils cannot provide a damping effect, they are unable to absorb energy generated from the impact. Furthermore, the resilience property thereof is not so delicate, and so an unpleasant noise occurs when they are extended and compressed. Additionally, the metal spring coils are heavy, making the overall weight of the bicycle heavier.

In view of this, it is highly desirable in the art to provide a high-performance saddle that has a satisfactory shock-absorbing capability and delivers a comfortable riding experience.

SUMMARY OF THE INVENTION

One objective of this invention is to provide a saddle with a satisfactory cushioning capability to allow the rider to ride on the saddle of this invention comfortably.

Another objective of this invention is to provide a saddle, which has a replaceable pad and cushion, to promote the added value of the saddle of this invention.

The saddle of this invention is defined by a crotch portion and a buttocks portion posterior to the crotch portion. The saddle comprises a pad, a base, at least one cushion, a first fixing device and a second fixing device. The base is disposed below the pad. The at least one cushion is disposed between the base and the pad, in which the at least one cushion has a contour substantially the same as the pad at the buttocks portion and is adapted to space the base and the pad apart. The first fixing device is adapted to detachably fasten the at least one cushion and base. The second fixing device is adapted to detachably fasten the at least one cushion and the pad. The first and the second fixing devices have no direct contact with each other, to prevent the impact force from being transferred to the buttocks of the rider directly via the first and the second fixing devices. Consequently, the impact force is transferred via the at least one cushion between the pad and the base, and most of the impact force is absorbed during the transferring process, thus achieving a cushioning effect.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

To eliminate disadvantages of conventional saddles equipped with metal spring shock absorbers, the saddle of this invention comprises a base, a pad, a first fixing device, a second fixing device and at least one cushion. The at least one cushion of this invention is disposed between the base and the pad. In an area where there is a great impact force, the pad and the base are fastened to the cushion at different positions by different fixing devices respectively. As a result, the transfer of the impact force to the rider's buttocks directly via the fixing devices is prevented, and the impact force can be absorbed by the cushion more effectively. Hereinafter, a detailed description of this invention will be made with reference to embodiments thereof.

Figure 1:
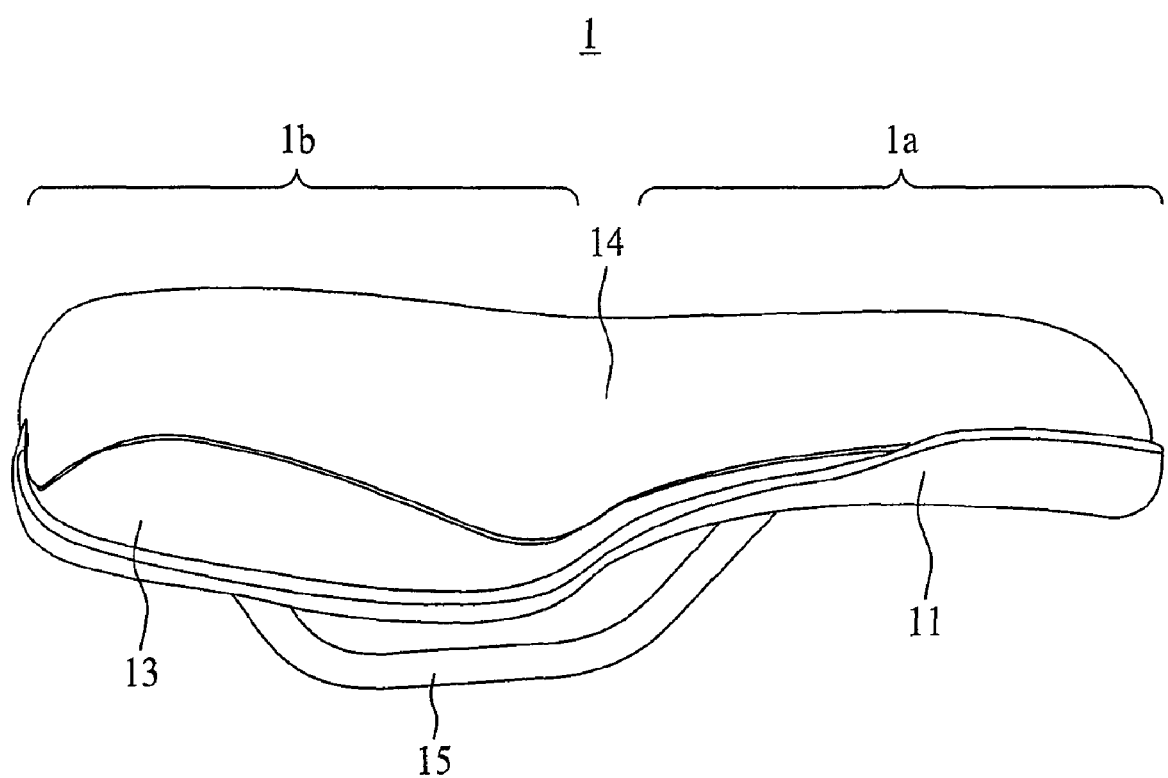
FIG. 1 is a side view of a saddle of this invention.

FIG. 1 is a side view of a saddle 1 according to an embodiment of this invention. The saddle 1 is generally divided into a crotch portion 1a and a buttocks portion 1b along a longitudinal axis. A rider's body weight is primarily supported by the buttocks portion 1b, so that a cushion 13 is disposed at least in the buttock portion 1b to absorb the impact energy.

To provide a satisfactory cushioning effect, the cushion of this invention may be made of air bags, silicone elements, foam elements or other cushions. Because air bags not only deliver an excellent cushioning effect but also have a light weight, air bags are preferred for use as the cushion. In the following description, air bags will be illustrated as the cushion used in this embodiment of this invention. However, in practice, the cushion is not merely limited to the air bags, and any of the materials describe above or other materials may also be used instead.

Figure 2:
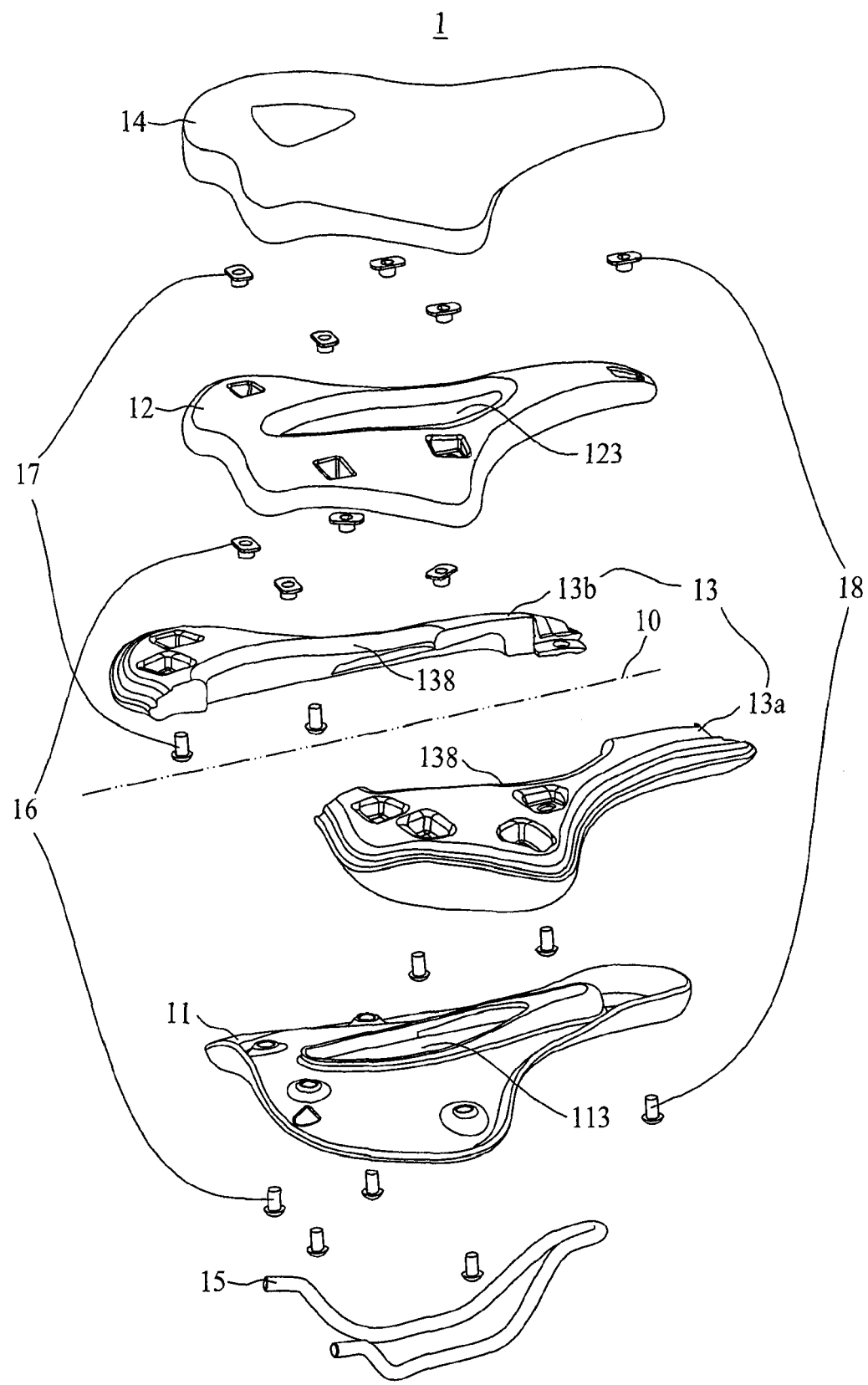
FIG. 2 is a schematic exploded view of the saddle of this invention.

In reference to FIGS. 1 and 2, the saddle 1 comprises a base 11, a pad 12, at least one cushion 13, a cover 14, a rail device 15, a first fixing device 16 and a second fixing device 17. The base 11 is disposed below the pad 12, and the cushion 13 is disposed between the base 11 and the pad 12. The first fixing device 16 is adapted to fasten the cushion 13 and base 11, while the second fixing device 17 is adapted to fasten the cushion 13 and the pad 12. The cover 14 is adapted to cover the pad 12 and disperse pressure onto the pad 12 to improve comfort to the rider's buttock. The rail device 15 is disposed on the bottom surface of the base 11 to fasten the saddle 1 onto a bicycle frame.

It should be particularly noted herein that at least at the buttocks portion 1b, the cushion 13 has a contour substantially the same as the pad 12 to space the base 11 and the pad 12 apart. The first and the second fixing devices 16, 17 make no direct contact with each other, so as not to transfer the impact force to the rider's buttocks directly via the first and the second fixing devices 16, 17. Consequently, the impact energy is absorbed by the cushion 13 between the base 11 and the pad 12 and a cushion effect is achieved.

In this embodiment, the cushion 13 comprises two air bags, namely, a first air bag 13a and a second air bag 13b. The first and the second air bags 13a, 13b are symmetrical to each other in shape, and are disposed between the base 11 and the pad 12 symmetrically with respect to a centerline 10 in the longitudinal direction of the saddle 1. When assembled, the first and the second air bags 13a, 13b form a cushion 13 with a contour substantially the same as the pad 12 at the buttocks portion 1b.

Both the first and the second fixing devices 16, 17 are located in the buttock portion 1b that supports most of the body weight. The first fixing device 16 is adapted to fasten the first and the second air bags 13a, 13b to the base 11, and the second fixing device 17 is adapted to fasten the first air bag 13a and the second air bag 13b to the pad 12. The first and the second fixing devices 16, 17 may be selected from a group consisting of bolts, rivets, tenons, adhesives and the combination thereof, or other fixing means. In this embodiment, the first and the second fixing devices 16, 17 are preferably adapted to detachably fasten the base 11 and the pad 12 to the cushion 13, so that the rider may switch between different pads 12 and cushions 13 (i.e., the first and the second air bags 13a, 13b) on his or her own, thus improving the added value of this product. In the various fixing means described above, bolts are known to provide a good fastening effect and facilitate repeated detachment and fastening, so the bolts are preferably adopted for the fixing devices of this embodiment to detachably fasten the base 11, the pad 12 and the cushion 13.

Figure 3:
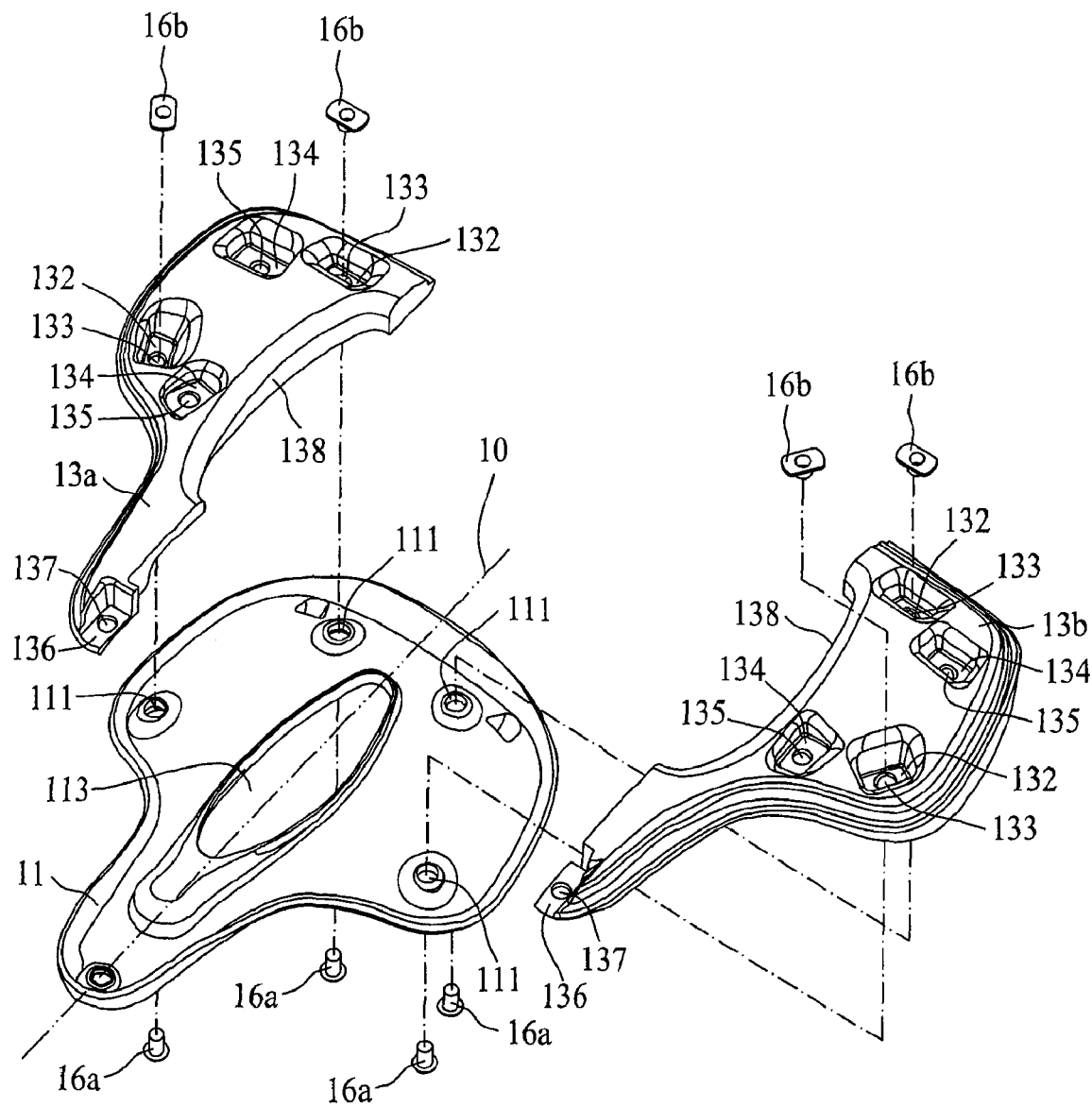
FIG. 3 is a schematic exploded view illustrating how the cushion and base of this invention are fastened.
Figure 4:
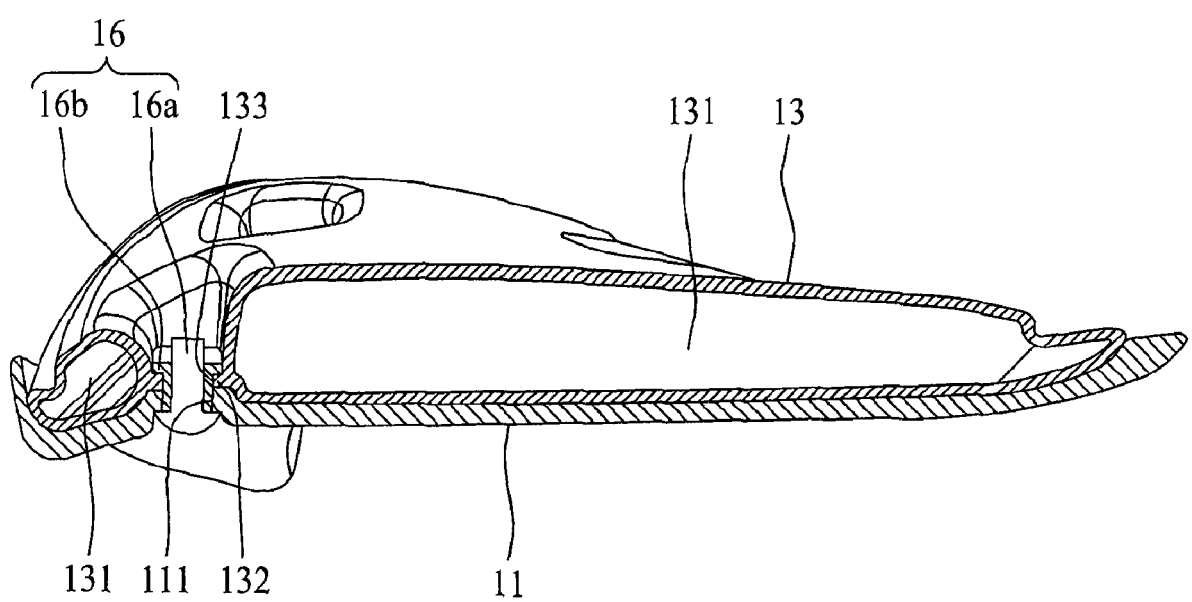
FIG. 4 is a schematic cross-sectional view of the cushion and the base of this invention when fastened together.

Next, in reference to FIGS. 3 and 4, the method in which the first fixing device 16 fastens the base 11 and the cushion 13 will be described in detail hereinbelow. As shown, the first fixing device 16 comprises a plurality of bolts, while the base 11 is formed with a plurality of first through holes 111 and a first receiving space. The first receiving space is adapted to receive and constrain at least one portion of the cushion 13 when the base 11 is fastened to the cushion 13.

At positions corresponding to the first through holes 111, the first and the second air bags 13a, 13b of the cushion 13 are respectively formed with at least one first closed portion 132 and at least one second through hole 133 disposed on the first closed portion 132. The first closed portion 132 is recessed into each of the air bags 13a, 13b, so that the upper outer membrane and the lower outer membrane of each of the air bags 13a, 13b are joined with each other in the first closed portion 132 and define at least one independent air chamber 131 within each of the air bags 13a, 13b. The first screws 16a of the first fixing device 16 are inserted through the first through holes 111 and the second through holes 133 correspondingly to be engaged with first nuts 16b of the first fixing device 16 to fasten the first and the second air bags 13a, 13b to the base 11.

In this embodiment, the first fixing device 16 comprises four bolts, i.e., four first screws 16a and four first nuts 16b, and each of the first and the second air bags 13a, 13b are formed correspondingly with two first closed portions 132 and two second through holes 133.

Figure 5:
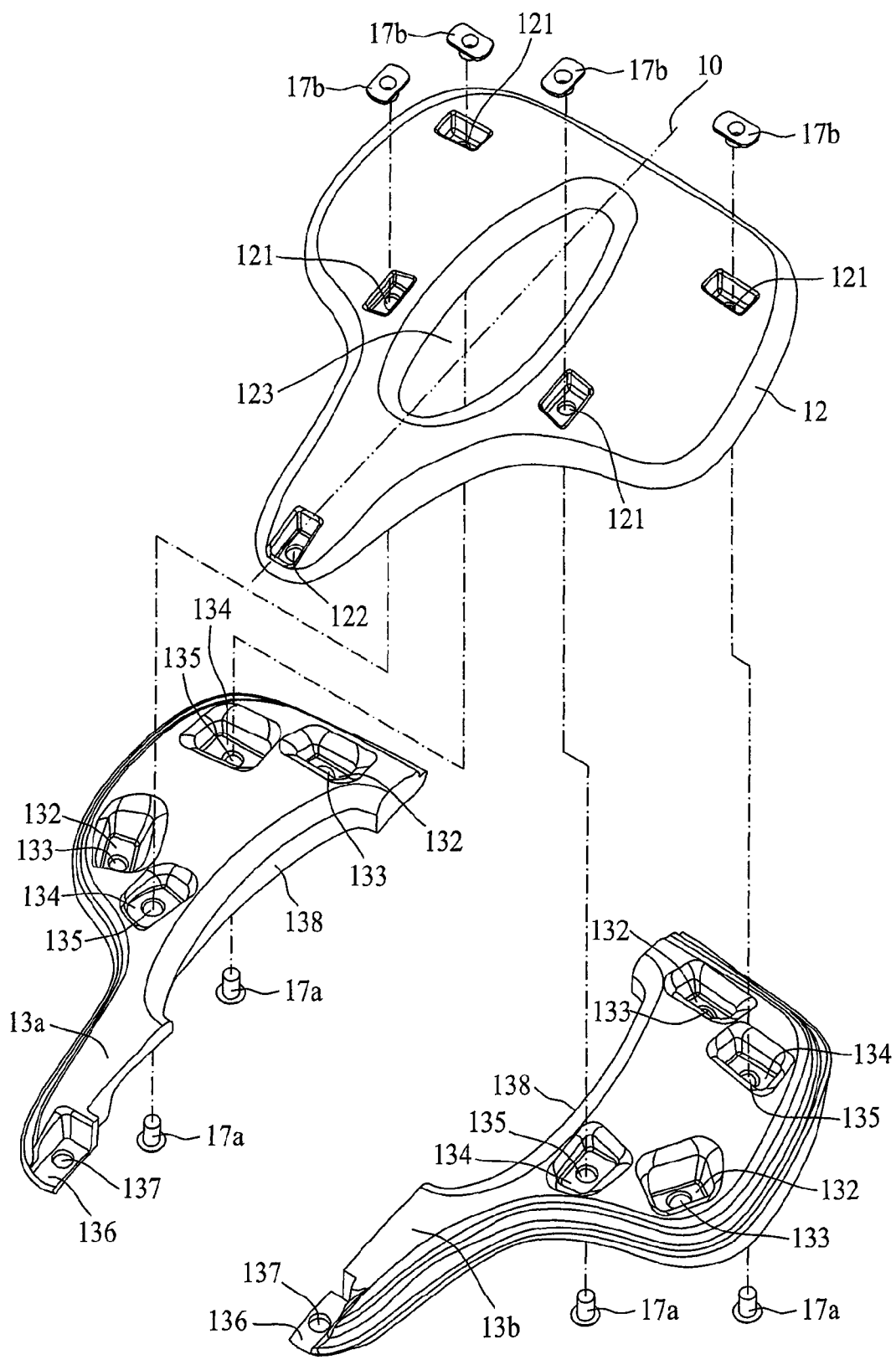
FIG. 5 is a schematic exploded view illustrating how the cushion and pad of this invention are fastened.
Figure 6:
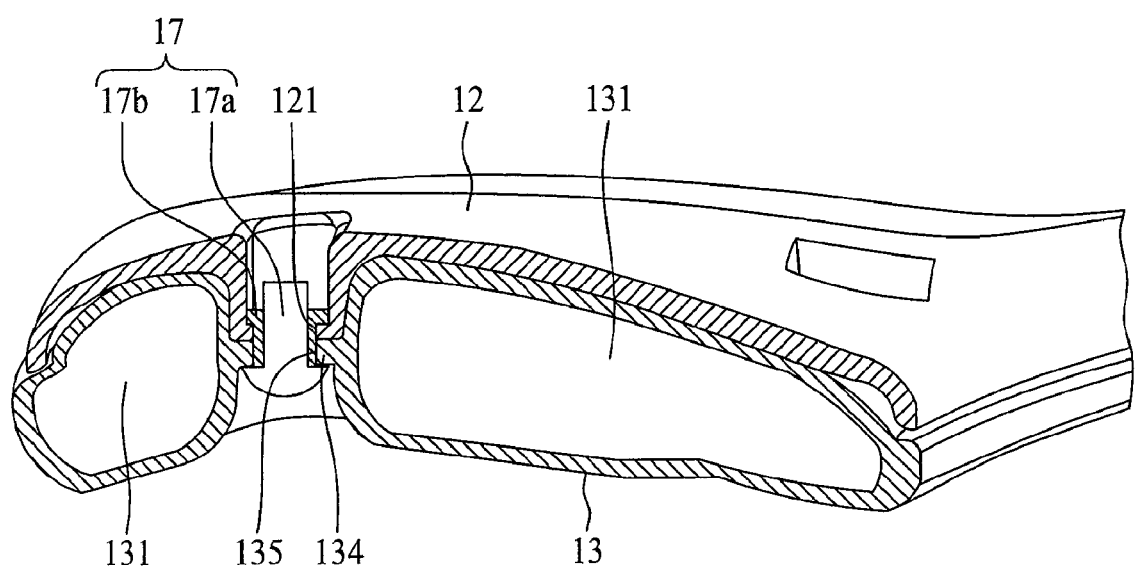
FIG. 6 is a schematic cross-sectional view of the cushion and the pad of this invention when fastened together.

Next, in reference to FIGS. 5 and 6, the method in which the second fixing device 17 fastens the pad 12 and the cushion 13 will be described in detail hereinbelow. As shown, the second fixing device 17 comprises a plurality of bolts, and the pad 12 is formed with a plurality of third through holes 121 and a second receiving space. The second receiving space is adapted to receive and constrain at least one portion of the cushion 13 when the pad 12 is fastened to the cushion 13.

At positions corresponding to the third through holes 121, the first and the second air bags 13a, 13b of the cushion 13 are respectively formed with at least one second closed portion 134 and at least one fourth through hole 135 disposed on the second closed portion 134. The second closed portion 134 is recessed into each of the air bags 13a, 13b, and the upper outer membrane and the lower outer membrane of each of the air bags 13a, 13b are joined with each other in the second closed portion 134 to define at least one independent air chamber 131 within each of the air bags 13a, 13b. The second screws 17a of the second fixing device 17 are inserted through the third through holes 121 and the fourth through holes 135 correspondingly to be engaged with the second nuts 17b of the second fixing device 17, to fasten the first and the second air bags 13a, 13b to the pad 12.

In this embodiment, the second fixing device 17 comprises four bolts, i.e., four second screws 17a and four second nuts 17b, and each of the first and the second air bags 13a, 13b are formed correspondingly with two second closed portions 134 and two fourth through holes 135.

Figure 7:
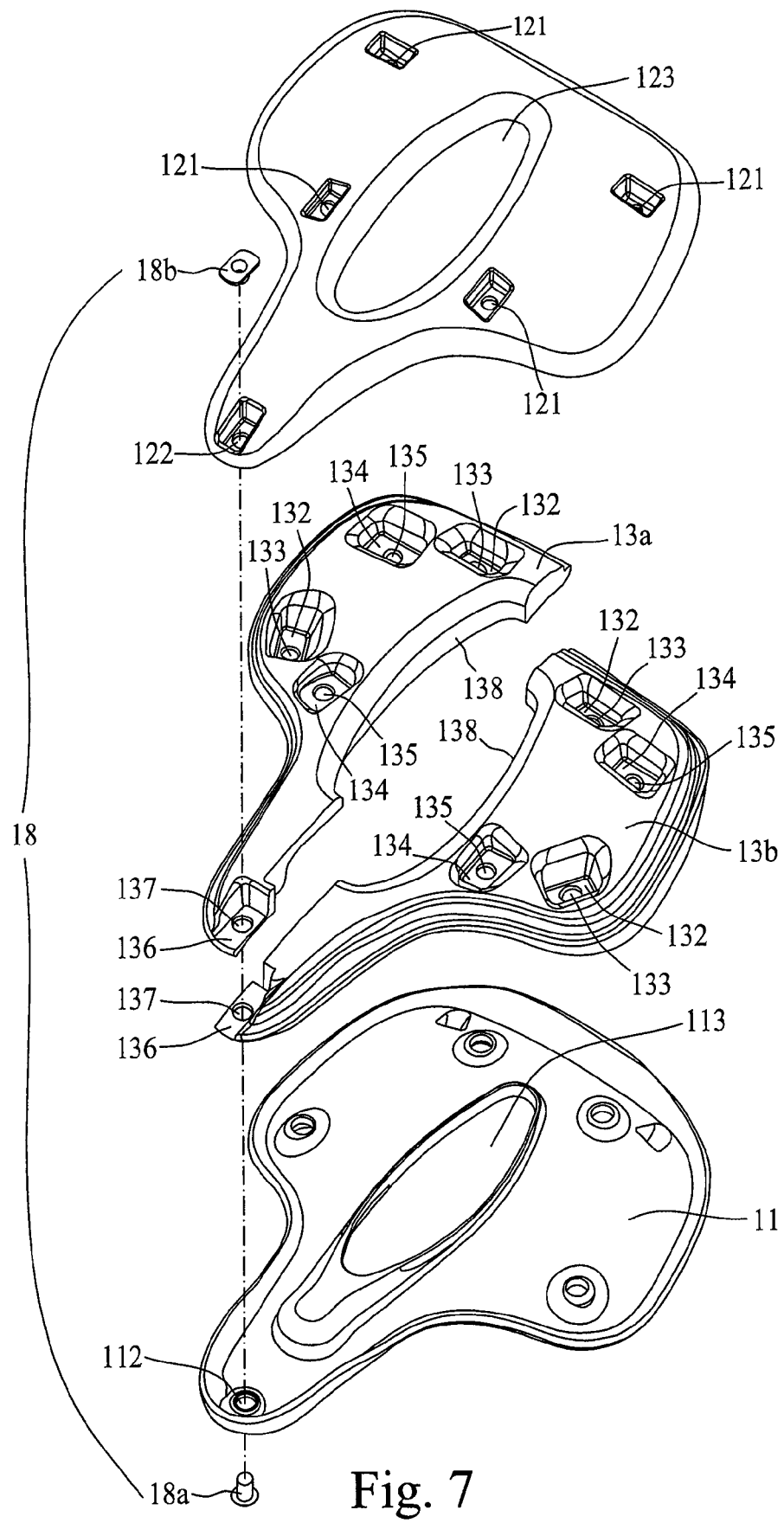
FIG. 7 is a schematic exploded view illustrating how a third fixing device of this invention works.

In reference to FIG. 7, the saddle 1 of this invention further comprises a third fixing device 18 located in the crotch portion 1a to further secure the first and the second air bags 13a, 13b, and is correspondingly formed with at least one fifth through hole 112 on the base 11 and at least one sixth through hole 122 on the pad 12. Like the first and the second fixing devices 16, 17, the third fixing device 18 may also be selected from a group consisting of bolts, rivets, tenons, adhesives and the combination thereof. In this embodiment, the third fixing device 18 is at least one bolt comprising a third screw 18a and a third nut 18b, which can detachably fasten the base 11, the pad 12 and the first and the second air bags 13a, 13b of the cushion 13.

Each of the first and the second air bags 13a, 13b of the cushion 13 is correspondingly formed with at least one extended portion 136 independent of the air chamber 131 and at least one seventh through hole 137 disposed on the extended portion 136. After assembly of the saddle 1 is completed, each of the extended portions 136 extends to the crotch portion 1a and overlaps with each other. The third screws 18a are inserted through the fifth through holes 112, the through holes 137 of the first and the second air bags 13a, 13b and the sixth through holes 122 correspondingly to be engaged with the third nuts 18b to detachably fasten the first and the second air bags 13a, 13b between the base 11 and the pad 12.

When riding in a common posture, the rider's crotch portion tends to be compressed by the saddle, causing a stuffy feeling at this portion due to poor air permeability. Additionally, the saddle may further compress the blood vessels and nerves in the crotch portion, causing a numb and discomfortable feeling at the perineum after the rider has ridden for a period of time. To solve this problem, the pad 12 of the saddle 1 of this invention is formed with a first hollowed portion 123, as shown in FIGS. 2 and 7. The first hollowed portion 123 is adapted to disperse pressure experienced by the rider's crotch portion to alleviate the discomfortable numb feeling.

Furthermore, the base 11 is formed with a second hollowed portion 113 corresponding to the first hollowed portion 123, and the cushion 13 is correspondingly formed with the ventilating portion 138 corresponding to the first hollowed portion 123. In this embodiment, the first and the second air bags 13a, 13b respectively have a ventilation portion 138 in symmetry with respect to each other, which corresponds to the first hollowed portion 123 and the second hollowed portion 113 after the base 11 and the pad 12 are joined together.

With the above arrangement, the ambient air is adapted to flow through the second hollowed portion 113, the ventilating portion 138 and the first hollowed portion 123 for fluid connection between the downside of the base 11 and the upside of the pad 12. As a result, a ventilating effect is obtained and the stuffy feeling is alleviated. Correspondingly, to prevent obstruction of the air flow, the cover 14 covering the pad 12 should be a foam element that exhibits air permeability by allowing air to flow through the cover 14. Furthermore, because the cover 14 made of the foam element is deformable, body weight can be dispersed throughout the pad 12 more uniformly, making the saddle 1 of this invention more comfortable.

In summary, the saddle of this invention fastens the base and the cushion as well as the pad and the cushion respectively and separately in a specially designed fastening manner, so the cushion (air bags) disposed between the base and the pad can completely absorb both the impact force transferred from the base upwards due to the variation of road conditions and the rider's weight transferred from the pad downwards. Furthermore, because both the pad and the cushion (air bags) are detachably fastened in the saddle, the rider may readily replace between pads and/or air bags of various styles or replace worn pads and/or bags, thus improving the added value of the saddle product remarkably. Meanwhile, the saddle of this invention exhibits satisfactory air permeability and can avoid discomfort due to concentrated pressure at the crotch portion of the rider. Consequently, this remarkably improves comfort of the rider riding on the saddle of this invention and addresses various problems of the conventional saddles.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A saddle, defined by a crotch portion and a buttocks portion posterior to the crotch portion, the saddle comprising:
   a pad;
   a base disposed below the pad;
   at least one cushion, disposed between the base and the pad, in which the at least one cushion has a contour substantially the same as the pad at the buttocks portion and is adapted to space the base and the pad apart;
   a first fixing device adapted to fasten the at least one cushion and base; and
   a second fixing device adapted to fasten the at least one cushion and the pad;
   wherein the pad and the base are cushioned through the at least one cushion therebetween, and the first fixing device and the second fixing device are both located in the buttocks portion, in which the at least one cushion is selected from the group consisting of air bags, silicone elements, foam elements and a combination thereof, and the first fixing device and the second fixing device are selected from the group consisting of bolts, rivets, tenons, adhesives and a combination thereof.

2. The saddle as claimed in claim 1, further comprising a cover adapted to cover and disperse pressure onto the pad.

3. The saddle as claimed in claim 2, wherein the cover is a foam element, and allows air to flow through the cover.

4. The saddle as claimed in claim 1, further comprising a rail device, disposed on a bottom surface of the base to fasten the saddle on a bicycle frame.

5. The saddle as claimed in claim 1, wherein the at least one cushion comprises at least one air bag.

6. The saddle as claimed in claim 5, wherein the saddle comprises a centerline, the at least one cushion comprises two air bags, and the two air bags are disposed on the base symmetrically with respect to the centerline.

7. The saddle as claimed in claim 6, wherein the first fixing device is adapted to detachably fasten the base and the air bags, and the second fixing device is adapted to detachably fasten the pad and the air bags.

8. The saddle as claimed in claim 7, wherein:
   the first fixing device comprises a plurality of bolts;
   the base is correspondingly formed with a plurality of first through holes;
   each of the air bags is correspondingly formed with at least one first closed portion and at least one second through hole disposed on the at least one first closed portion, in which the at least one first closed portion is recessed into each of the air bags and defines at least one independent air chamber within each of the air bags; and
   the bolts are inserted through the first through holes and the second through holes correspondingly to fasten the air bags and the base.

9. The saddle as claimed in claim 8, wherein the first fixing device comprises four bolts, the base is correspondingly formed with four first through holes, and each of the air bags is correspondingly formed with two first closed portions and two second through holes.

10. The saddle as claimed in claim 7, wherein:
    the second fixing device comprises a plurality of bolts;
    the pad is correspondingly formed with a plurality of third through holes;
    each of the air bags is correspondingly formed with at least one second closed portion and at least one fourth through hole disposed on the at least one second closed portion, in which the at least one second closed portion is recessed into each of the air bags and defines at least one independent air chamber within each of the air bags; and
    the bolts are inserted through the third through holes and the fourth through holes correspondingly to fasten the air bags and the pad.

11. The saddle as claimed in claim 10, wherein the second fixing device comprises four bolts, the pad is correspondingly formed with four third through holes, and each of the air bags is correspondingly formed with two second closed portions and two fourth through holes.

12. The saddle as claimed in claim 6, wherein the pad further comprises a third fixing device, located in the crotch portion and adapted to fasten the base, the air bags and the pad.

13. The saddle as claimed in claim 12, wherein:
    the third fixing device comprises at least one bolt;
    the base is correspondingly formed with at least one fifth through hole;

the pad is correspondingly formed with at least one sixth through hole;

each of the air bags is correspondingly formed with at least one extended portion and at least one seventh through hole disposed on the at least one extended portion, in which each of the extended portions, independent of at least one independent air chamber defined in each of the air bags, extends to the crotch portion and overlaps with each other; and the at least one bolt is inserted through the at least one fifth through hole, the at least one sixth through hole and the seventh through holes correspondingly to detachably fasten the air bags, the pad and the base.

14. The saddle as claimed in claim 1, wherein the pad is formed with a first hollowed portion adapted to disperse pressure.

15. The saddle as claimed in claim 14, wherein the base is formed with a second hollowed portion corresponding to the first hollowed portion, the at least one cushion is formed with at least one ventilating portion corresponding to the first hollowed portion, and ambient air is adapted to flow through the second hollowed portion, the at least one ventilating portion and the first hollowed portion for fluid connection between a downside of the base and an upside of the pad.

16. The saddle as claimed in claim 1, wherein the base is formed with a first receiving space adapted to receive and constrain at least one portion of the at least one cushion.

17. The saddle as claimed in claim 16, wherein the pad is further formed with a second receiving space adapted to receive and constrain at least one portion of the at least one cushion.

* * * * *